Dec. 30, 1952  J. F. DAWSON  2,623,553
SAW BLADE HAVING DETACHABLE FORKED SPRUNG TEETH
Filed July 14, 1949
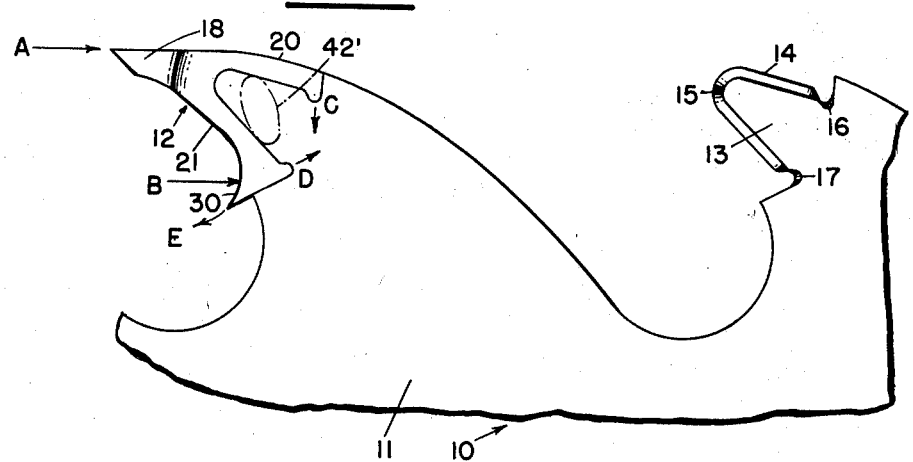
FIG. 1
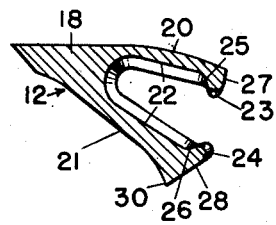
FIG. 4
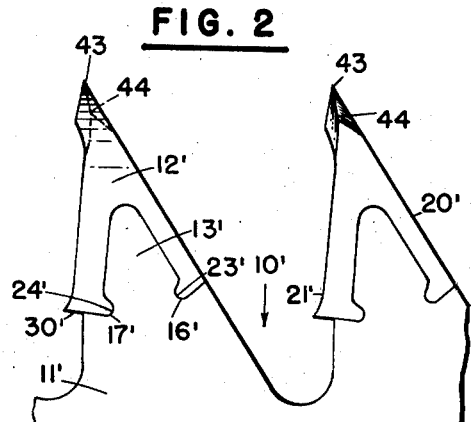
FIG. 2
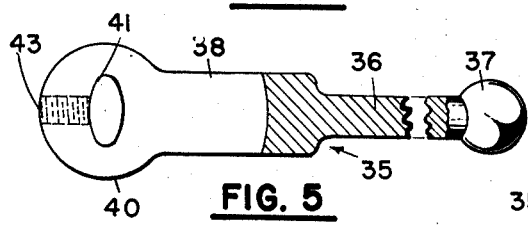
FIG. 3
FIG. 5
FIG. 6
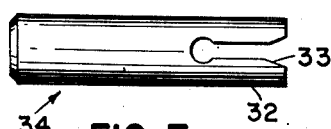
FIG. 7
Inventor
JASPER F. DAWSON
By Gustave Miller,
Attorney Patented Dec. 30, 1952

2,623,553

UNITED STATES PATENT OFFICE 2,623,553

SAW BLADE HAVING DETACHABLE FORKED SPRUNG TEETH

Jasper F. Dawson, Butte, Mont.

Application July 14, 1949, Serial No. 104,788

6 Claims. (Cl. 143—141)

This invention relates to a saw including attachable and detachable forked sprung saw tooth.

It is an object of this invention to provide an attachable forked saw tooth which may be used on all types of cooperating saw blades, such as rip saws, whether band, circular, or hand saw, cross cut saw bands, and the like.

A further object of this invention is to provide a forked saw tooth that will hold itself to the saw blade, and wherein the moment of the forces thereon created by the saw in operation tend to cause the tooth to grip the saw blade even more tightly.

A further object of this invention is to provide a changeable tooth which in its method of fastening does not alter the tension of the blade in its perimeter and does not depend on the body of the blade enough to interfere with the saw or the tooth traveling and curving around shives as required in a band mill.

A further object of this invention is to provide a forked saw tooth and cooperating saw blade which are readily unitable and separable, and which may be operated in the same manner as any type of integral saw blade and tooth without any more danger of a tooth coming off in operation.

Still a further object of this invention is to provide a detachable saw tooth wherein the saw tooth operating edges are hardened or armored for long operating life.

Still a further object of this invention is to provide an attachable and detachable forked sprung tooth and a saw blade having a projecting tooth receiving base to cooperate therewith.

Still a further object of this invention is to provide an attachable saw tooth having a sawdust deflecting platform thereon on the side of the tooth that is further from the work during the sawing operation, the platform being wider than the saw blade and curved forwardly to deflect the sawdust forwardly and carry it in the gullet thus formed until the tooth has cleared the saw cut.

Still a further object of this invention is to provide a saw blade having a plurality of projecting saw tooth bases arranged to cooperate with and securely support the separable teeth of this invention thereon.

Other additional objects will more fully appear from the following description, and that the invention may be more fully understood, reference is had to the accompanying drawing forming a part of the present description and illustrating a preferred embodiment of the invention, in which:

Fig. 1 is a plan fragmentary view of this invention as applied to a rip saw type of blade.

Fig. 2 is a similar view as applied to a cross cut saw.

Fig. 3 is a side plan view of a detached tooth.

Fig. 4 is a section on line 4—4 of Fig. 3.

Fig. 5 and Fig. 6 are edge and sectional side views of a tool for removing the tooth, and Fig. 7 is a plan view of a punch tool for inserting the tooth.

There is shown at 10 a rip saw including a saw blade 11 arranged to receive and hold an appropriate number of insertable forked saw teeth 12 of this invention. The saw blade 11 is provided with an appropriate number of projecting saw tooth bases 13 which are substantially of inverted V-shape in outline, and rounded at their apex 15 and also being inverted V-shape in edge cross section along the major portion thereof as far as the anchoring notches 16 and 17.

The forked tooth 12 consists of a tooth point or edge 18 from which extends a pair of diverging anchoring spring fingers 20 and 21 at a V-angle to each other, complementary to the blade tooth base 13 when in position thereon, and the inner side of each anchoring finger is internally V-grooved at 22 complementary to the tooth base edge 14. Each finger 20 and 21 terminates in an anchor tip 23 and 24 complementary to the anchor notches 16 and 17 of the tooth base 13, the two tips converging toward each other.

As will be seen by comparing Fig. 4 with Fig. 1, the angle of the apex of the V between the fingers 20 and 21 of the tooth is more acute before the tooth 12 is placed on its base 13, and hence, while the tooth is complementary to the base when in position thereon, the fingers are under tension tending to grip the base with sufficient force to overcome any force tending to dislodge them while in operation. Furthermore, the V groove 22 complementing the V edges 14 of base 13 causes the teeth to align themselves perfectly and prevent them from tipping to one side or the other. With the teeth thus in proper alignment, the teeth make a desirable straight cut and not a ragged cut such as made by tipped teeth.

It will also be noted that the notches 16 and 17 and the tips 23 and 24 as seen in Fig. 3, are of complementary V-shape in edge view, and are joined thereto by slightly flattened shoulders 25 and 26. The angle between the axial direction of the edges of the fingers 20 and 21 and the end edges 27 and 28 is obtuse or slightly greater than a right angle. However, the outer side of tooth finger 21 curves outwardly at 30 to provide a sawdust deflecting platform wider than the thickness of the saw blade; the curve sufficient to cause surplus sawdust to move in direction E; which is substantially the same as blade motion. As a result, the end of the finger 21 extends beyond the edge of the saw blade 11, while the end of the other finger 20, lacking the deflecting platform, is in alignment with the edge of the saw blade 11.

The anchor notches 16 and 17 are completely complementary to the anchor tips 23 and 24 and to the flattened shoulders 25 and 26 as well as to the end edges 27 and 28, except that the saw tooth 12 is thicker than the saw blade 11, as apparent from Fig. 3.

To insert the forked tooth 12 on the blade 11 it is first greased slightly and then placed over the blade tooth base 13 in proper position, and then a punch tool 31, bifurcated at 32 and having with complementing V sides 33, is placed over the swaged tooth 18 and slightly tapped with a hammer, causing the spring tooth fingers 20 and 21 to slightly diverge as the V notched tips 23 and 24 ride along the base V-edges 14 and then snap into the anchor notches 16 and 17 to hold the teeth firmly in place. When the saw 10 is in cutting operation, particularly in the ripping tooth just described, forces A and B are produced against the tooth edge 18. Force A tends to dislodge the tooth, but is utilized to help hold the tooth in the saw by its resultants at C and D, thru forces along fingers 20 and 21, to angled shoulders 27 and 28, while force B against the curved sawdust deflecting platform 30 tends to hold finger 21 in position. This force B is greatly supplemented by forces C and D, which forces C and D are the result of two forces, one as a result of forces from A moving along fingers and thru angled shoulders as above and the other the result of the tension created by the fact that angle between the tooth diverging fingers 20 and 21 is substantially more acute before the tooth is placed in position on the blade base 13. Hence the spring fingers, forcibly held apart, together with the transmission at force A thru fingers 20 and 21 and obtuse angles 27 and 28 cause the anchor tips to grip the base with sufficient force to prevent dislodgement while in sawing operation.

To remove the tooth, use is made of the tool 35 shown in Figs. 5 and 6. This tool 35 consists of a handle 36, which, if desired, may be curved as desired and may be provided with a knob 37 and is provided with bifurcated arms 38 spaced apart a distance at least slightly greater than the thickness of the tooth 12. Each arm 38 ends in an enlarged head 40 having an oval shaped slot 41 whose major axis may be at right angles to the axis of the arm 38. An oval shaped cam 42, having its minor axis less than the distance between the saw blade anchor tips and its major axis greater than this anchor tip distance but less than the length of the saw tooth anchor fingers, is provided to fit into each head slot 41 and may be held therein against displacement by one or more set screws inserted through appropriate threaded apertures such as shown at 43. The cams 42 are preferably thicker than the arms 38, and when placed in position, the two cams will be spaced apart a distance just barely greater than the thickness of the blade 11 and hence substantially less than the thickness of the tooth 12. When removing the tooth, the tool 35 is manipulated to bring the cams 42 to the position shown at 42' in Fig. 1. Then, rotation of the tool handle about the transverse axis of the cam 42 will camber the tooth fingers 20 and 21 away from each other, enabling the tooth to slip off its base and be readily removed.

The principles of this invention may be adapted to any type of saw. In Fig. 2, it is shown adapted to a cross cut saw 10' having a blade 11' and tooth bases 13', with insertable teeth 12' complementary thereto just as in the form already described, including the spring fingers 20' and 21' and their anchor tips 23' and 24'; the finger 21' also having the sawdust deflecting platform 30'. The distance between the anchor notches 16' and 17' on tooth base 13' is slightly greater than the corresponding distance across the base 13 and the obtuse angle at 28' is somewhat greater, thereby providing a somewhat tighter gripping action. Also, instead of being swaged at right angles as is the rip saw tooth 12 and 18, the cross-cut tooth 12' is set or bent and beveled to a high apex point 43 at one side and in an angular V to a lower apex point 44 on the opposite side, and the teeth 12' are provided in right hand and left hand sets to be placed alternately on the blade 11' as shown. Obviously, the tooth point will be made appropriate to the particular use for which is it intended, while the principles of this invention are applied to the fingers and anchors thereof for detachably holding it on the blade, and the tools for attaching and detaching teeth.

In operation, the tooth is applied to the blade by means of the punch tool 31 and a hammer, and removed therefrom when desired by means of the cam tool 35. When in position on the blade, the saw is used in the conventional manner for which it is intended, and the teeth remain firmly in position thereon.

It is possible that various changes and modifications may be made in my invention without departing from the spirit and scope thereof, and I do not wish to be understood as limiting myself to the specific construction nor the specific uses therein described.

What is claimed is:

1. A forked saw tooth comprising a saw tooth point and a pair of extending diverging spring anchor fingers, each anchor finger including an anchor tip adjacent its end extending into the angle between the diverging fingers, in combination with a saw blade including a projecting saw tooth base having oppositely disposed anchor notches, the thickness of the sawtooth fingers being appreciably greater than the thickness of the saw blade.

2. A forked saw tooth comprising a saw tooth point and a pair of extending diverging spring anchor fingers, each anchor finger including an anchor tip adjacent its end extending into the angle between the diverging fingers, the inner face of each anchor finger being V-grooved, in combination with a saw blade including a projecting saw tooth base having oppositely disposed anchor notches, the thickness of the saw tooth fingers being appreciably greater than the thickness of the saw blade, the edges of said saw tooth base being complementary to the V-grooves of said fingers.

3. A forked saw tooth comprising a saw tooth point and a pair of extending diverging spring anchor fingers, each anchor finger including an anchor tip adjacent its end extending into the angle between the diverging fingers, the inner face of each anchor finger being V-grooved, each anchor tip being likewise V-grooved, in combination with a saw blade including a projecting saw tooth base having oppositely disposed anchor notches, the thickness of the saw tooth fingers being appreciably greater than the thickness of the saw blade, the edges of said saw tooth base being complementary to the V-grooves of said fingers and tips.

4. A forked saw tooth comprising a saw tooth point and a pair of extending diverging spring anchor fingers, each anchor finger including an anchor tip adjacent its end extending into the angle between the diverging fingers, the inner face of each anchor finger being V-grooved, each anchor tip being likewise V-grooved and joined to the finger face V-groove by a flattened shoulder, in combination with a saw blade including a projecting saw tooth base having oppositely disposed anchor notches, the thickness of the sawtooth fingers being appreciably greater than the thickness of the saw blade, the edges of said saw tooth base being complementary to the V-grooves of the said fingers, tips, and flattened shoulders.

5. A forked saw tooth comprising a saw tooth point and a pair of extending diverging spring anchor fingers, each anchor finger including an anchor tip adjacent its end extending into the angle between the diverging fingers, the inner face of each anchor finger being V-grooved, each anchor tip being likewise V-grooved and joined to the finger face V-groove by a flattened shoulder, the finger end edges extending at an obtuse angle to the apex line of the finger face V-groove, in combination with a saw blade including a projecting saw tooth base having oppositely disposed anchor notches, the thickness of the saw tooth fingers being appreciably greater than the thickness of the saw blade, the edges of said saw tooth base being complementary to the V-grooves of the said fingers, tips, and flattened shoulders, the tooth base projecting at an acute forwardly extending angle to the saw blade.

6. A forked saw tooth comprising a saw tooth point and a pair of extending diverging spring anchor fingers, each anchor finger including an anchor tip adjacent its end extending into the angle between the diverging fingers, the inner face of each anchor finger being V-grooved, each anchor tip being likewise V-grooved and joined to the finger face V-groove by a flattened shoulder, the finger end edges extending at an obtuse angle to the apex line of the finger face V-groove, in combination with a saw blade including a projecting saw tooth base having oppositely disposed anchor notches, the thickness of the saw tooth fingers being appreciably greater than the thickness of the saw blade, the edges of said saw tooth base being complementary to the V-grooves of the said fingers, tips, and flattened shoulders, the tooth base projecting at an acute forwardly extending angle to the saw blade, and a sawdust deflecting platform on the outer face of the inner tooth finger.

JASPER F. DAWSON.

REFERENCES CITED

The following references are of record in the file of this patent:

UNITED STATES PATENTS

| Number | Name | Date |
| --- | --- | --- |
| 105,349 | Maulick | July 12, 1870 |
| 170,833 | Emerson | Dec. 7, 1875 |
| 190,062 | Miller | Apr. 24, 1877 |
| 292,809 | Harris | Feb. 5, 1884 |
| 361,142 | Dalton | Apr. 12, 1887 |
| 495,729 | Emerson | Apr. 18, 1893 |
| 542,378 | Shuster | July 9, 1895 |
| 1,326,796 | Sly | Dec. 30, 1919 |
| 1,434,437 | Hodgkins | Nov. 7, 1922 |
| 1,504,089 | Brisbin | Aug. 5, 1924 |
| 1,956,634 | Watson | May 1, 1934 |